United States Patent [19]

Bloom

[11] Patent Number: 5,032,690
[45] Date of Patent: Jul. 16, 1991

[54] POKE-THROUGH CONNECTOR ASSEMBLY

[75] Inventor: Myron G. Bloom, Santa Ana, Calif.

[73] Assignee: Masco Building Products Corp., Taylor, Mich.

[21] Appl. No.: 483,092

[22] Filed: Feb. 20, 1990

[51] Int. Cl.⁵ .............................................. H02G 3/22
[52] U.S. Cl. ................................................... 174/48
[58] Field of Search ............... 174/48; 52/221; 169/48

[56] References Cited

U.S. PATENT DOCUMENTS

| | | | |
|---|---|---|---|
| 2,279,791 | 4/1942 | Lamb | 169/2 |
| 3,646,244 | 2/1972 | Cole | 174/57 |
| 3,864,883 | 2/1975 | McMarlin | 52/221 |
| 3,956,573 | 5/1976 | Myers et al. | 174/48 |
| 3,995,102 | 11/1976 | Kohaut | 174/48 |
| 4,091,231 | 5/1978 | Sotolongo | 174/48 |
| 4,099,020 | 7/1978 | Kohaut | 174/48 |
| 4,237,666 | 12/1980 | Kohaut | 52/221 |
| 4,243,835 | 1/1981 | Ehrenfels | 174/48 |
| 4,264,779 | 4/1981 | Rhodes et al. | 174/48 |
| 4,272,643 | 6/1981 | Carroll et al. | 174/48 |
| 4,323,724 | 4/1982 | Shine | 174/48 |
| 4,336,416 | 6/1982 | Goodsell | 174/48 |
| 4,443,654 | 4/1984 | Flachbarth et al. | 174/48 |
| 4,477,694 | 10/1984 | Kohaut | 174/48 |
| 4,496,790 | 1/1985 | Spencer | 174/48 |
| 4,572,923 | 2/1986 | Castellani et al. | 174/48 |
| 4,573,297 | 3/1986 | Benscoter et al. | 52/221 |
| 4,770,643 | 9/1988 | Castellani et al. | 174/48 X |

Primary Examiner—Leo P. Picard
Assistant Examiner—David A. Tone

[57] ABSTRACT

The present invention discloses a poke-through connector assembly which may be assembled in an aperture within a concrete floor from only one side thereof. The connector includes a molded basket of electrical and thermal insulating material having an upper surface joined to a lower surface by integral columns. A flange extending from the upper surface prevents the connector from passing through the floor aperture, while a spring clip attached to the lower surface of the basket prevents the withdrawal of the connector. An electrical conduit is attached to the lower surface of the basket by the spring clip. Intumescent material placed within the basket expands to fill the aperture within the floor when a fire on the lower surface of the floor heats the connector. The conduction of heat from the fire through the connection is reduced because the insulating basket provides no metal conductive path from the electrical conduit and the spring clip to the upper surface of the basket. Once the basket of the connector fails, the spring clip prevents the connector from falling through the floor aperture, thus maintaining the fire rating of the connector within the floor.

23 Claims, 4 Drawing Sheets

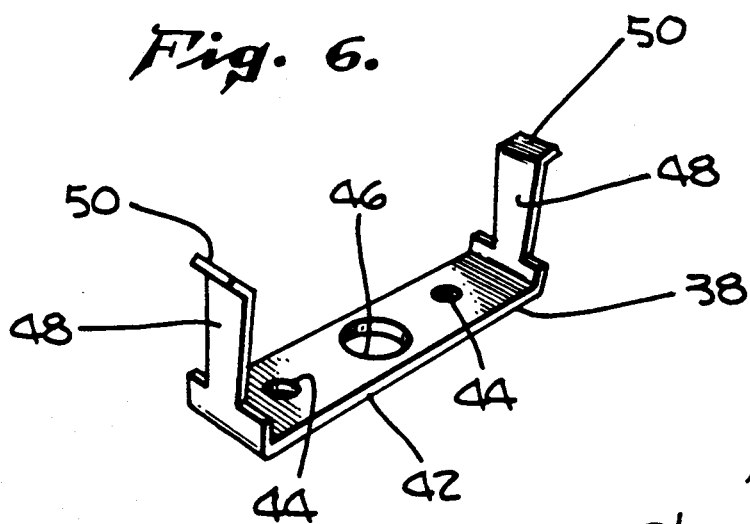
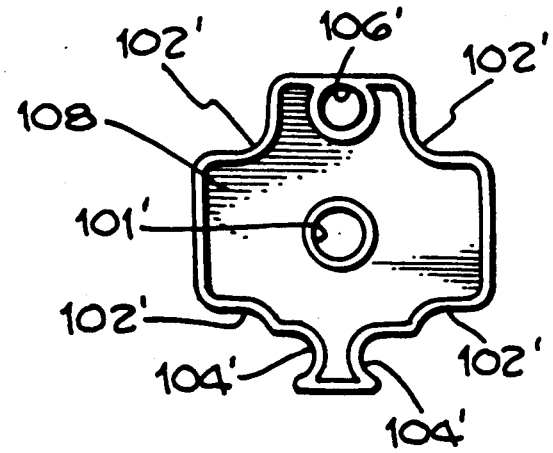
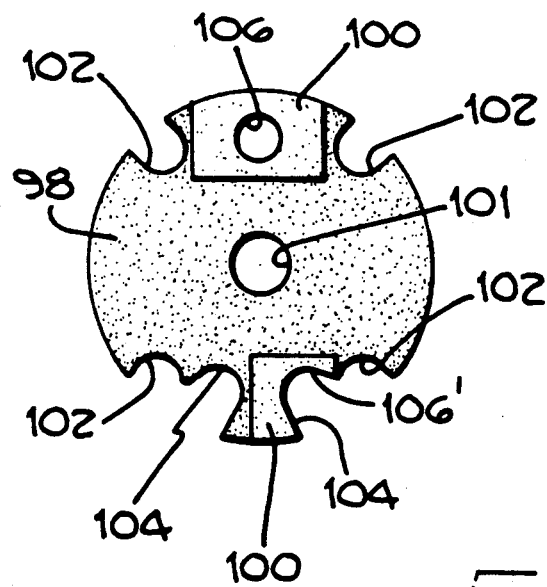
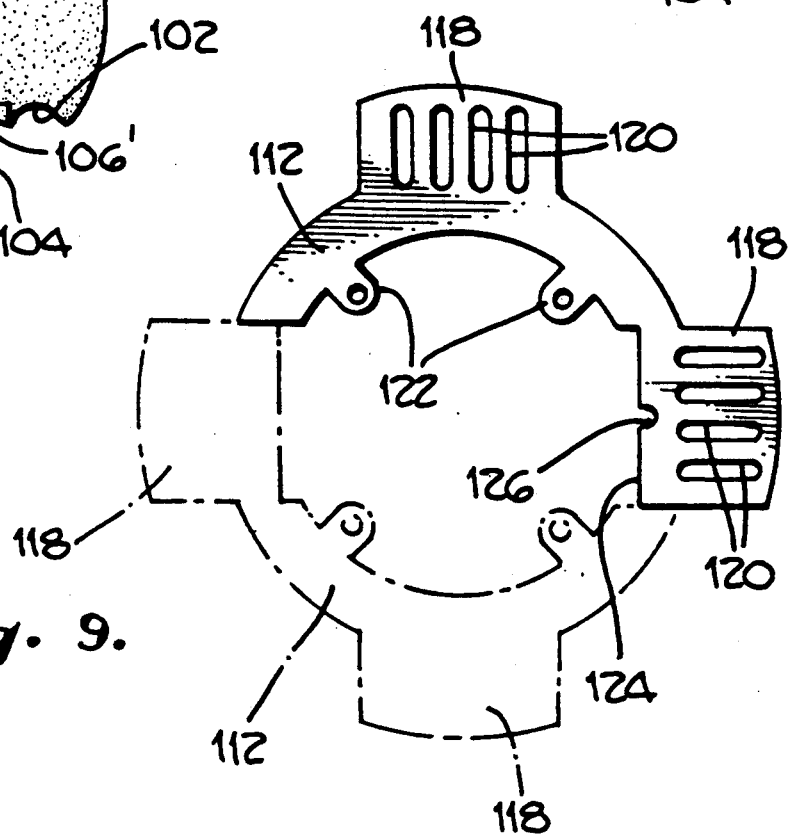

POKE-THROUGH CONNECTOR ASSEMBLY

BACKGROUND OF THE INVENTION

1. Field of the Invention

The present invention rates to poke-through connector and, more particularly, to a poke-through connector that may be assembled within an aperture in a concrete floor from one side thereof without the need for assembly from the other side. The poke-through connector assembly provides a fire-rated insulation between each side of the floor once assembled.

2. Description of the Prior Art

Modern high-rise buildings, such as office buildings, apartment complexes, condominiums and other structures, are typically built from a skeletal steel structure wherein the steel beams forming the structure are interconnected by rivets, bolts or other fasteners. The steel beams that form the floors of the structure are typically covered with corrugated steel plates upon which concrete may be poured or reinforced concrete may be poured without the use of the plates. The poured floors provide a resistance to the spread of heat that could ignite materials on an upper floor from a fire on the floor below.

One problem with maintaining the fire-rating of the poured concrete floors is the need to establish electrical wiring between them. This may be done by boring an aperture through the concrete floor and inserting a floor receptacle. Some receptacles used for this purpose have ignored the need for a fire-rated capability. See, for example, U.S. Pat. No. 3,646,244. Other connectors recognizing the need for closing the passageway formed by an aperture within a concrete floor have suggested the use of intumescent materials. See U.S. Pat. No. 3,864,883. The intumescent material used is a mixture of an intumescing binder and a filler which, when exposed to heat, expands rapidly. Such intumescent material may consist of sodium silicate or potassium silicate in combination with sodium bicarbonate, as suggested in U.S. Pat. No. 2,279,791, or in combination with clay or cellulatable glass as suggested in U.S. Pat. No. 3,864,883.

The use of intumescent material in electrical connector assemblies which are inserted into apertures within concrete floors has become a general standard as seen in U.S. Pat. Nos. 3,995,102; 4,099,020; 4,264,779; 4,336,416 and 4,477,694. However, these connectors suffer from configurations that permit the conduction of heat from one surface of the concrete floor to the other through metal-to-metal connections. All of the patents mentioned in this paragraph may be faulted because of this limitation. Typically, the metal-to-metal connections occur between upper and lower housings connected by screws and separated by intumescent rings sandwiched therebetween. The screws serve to conduct heat from the lower to upper housings. These prior art patents also thought that it is desirable to separate the wiring conduit into two compartments for electrical power wiring and signal wiring. This separation is established by a metal partition which extends from the lower housing to the upper housing through the aperture within the concrete floor. Examples of such partitions may be found in U.S. Pat. Nos. 3,995,102 and 4,477,694.

Many of the prior art connectors designed for use through concrete floors need to be assembled from both sides of the floor. In some designs, the housing on each side of the floor is larger than the aperture therethrough, see U.S. Pat. No. 3,995,102. In other designs, a special mounting bracket is required on the side of the connector opposite the electrical receptacle which requires an assembly operation on each side of the floor, see U.S. Pat. Nos. 4,091,231 or 4,336,416.

SUMMARY OF THE INVENTION

Accordingly, it is an object of the present invention to provide a poke-through connector assembly with an improved fire rating by eliminating all metal-to-metal connections between one side of the connector and the other.

It is another object of the present invention to provide a poke-through connector which may be assembled from but one side of the concrete floor without requiring an assembly operation on the other side.

A further object of the invention is to provide a poke-through connector assembly which, after insertion into an aperture within a concrete floor in one direction, is prevented from being removed. Thereafter, when the connector is exposed to excess heat, the intumescent material within the connector will expand to fill the aperture. The connector is designed with an insulated basket that melts to terminate connection between one side of the connector and the other but for the electrical wiring. Finally, the connector is designed to remain secured within the floor aperture after the insulated basket has been destroyed by heat.

A still further object of the invention provides a poke-through connector which may be inserted into apertures in concrete floors, regardless of the thickness thereof.

In accomplishing these and other objects, there has been provided a poke-through connector assembly with a basket formed from an electrical and thermal insulating material. The basket is constructed with upper and lower surfaces joined by a plurality of integral insulating columns which are formed to significantly reduce the amount of heat conducted therethrough. The upper surface of the basket is formed with a flange to prevent the connector assembly from passing completely through a floor aperture in which it is assembled, while the lower surface of the basket has a spring clip mounted thereto for engaging the sides of the floor aperture to prevent the withdrawal of the connector once inserted. An electrical receptacle may be mounted upon the flange formed by the upper surface of the basket, while an electrical conduit is attached to the lower surface. A second electrical receptacle is attached to the lower end of the conduit. Intumescent material is placed within the insulated basket and about the conduit. The upper and lower surfaces of the basket are not opposing surfaces to provide a space for the intumescent material to expand vertically.

When the poke-through connector assembly is exposed to heat, the intumescent material expands to fill the aperture within the concrete floor, thus preventing the spread of heat through convection. This expansion includes the vertical expansion of the intumescent material to fill the voids about the first electrical receptacle. Due to the unique configuration of the connector assembly, there is no metal-to-metal connection between the second receptacle and the first receptacle on opposite sides of the floor aperture except for the electrical wires passing therethrough. These wires are protected by an insulating cover about the first receptacle to further reduce the spread of heat by convection and conduction. Finally, a radiator fin is connected between the first electrical receptacle and the flange of the insulating bracket to permit the heat carried thereto by the electrical ground wire to be dissipated by radiation. This prevents a build up of heat beyond an acceptable limit within a given time period to increase the fire rating of the poke-through connector assembly.

DESCRIPTION OF THE DRAWINGS

Other objects and advantages of the present invention will become better understood after a careful consideration of the following specification and drawings, wherein:

FIG. 6 is a perspective view of the spring clip;

FIG. 7 is a top view of one of the intumescent wafers;

FIG. 8 is a top view of the spacer used between intumescent wafers; and

FIG. 9 is a top view of the radiator fin.

DESCRIPTION OF THE PREFERRED EMBODIMENT

Figure 1:
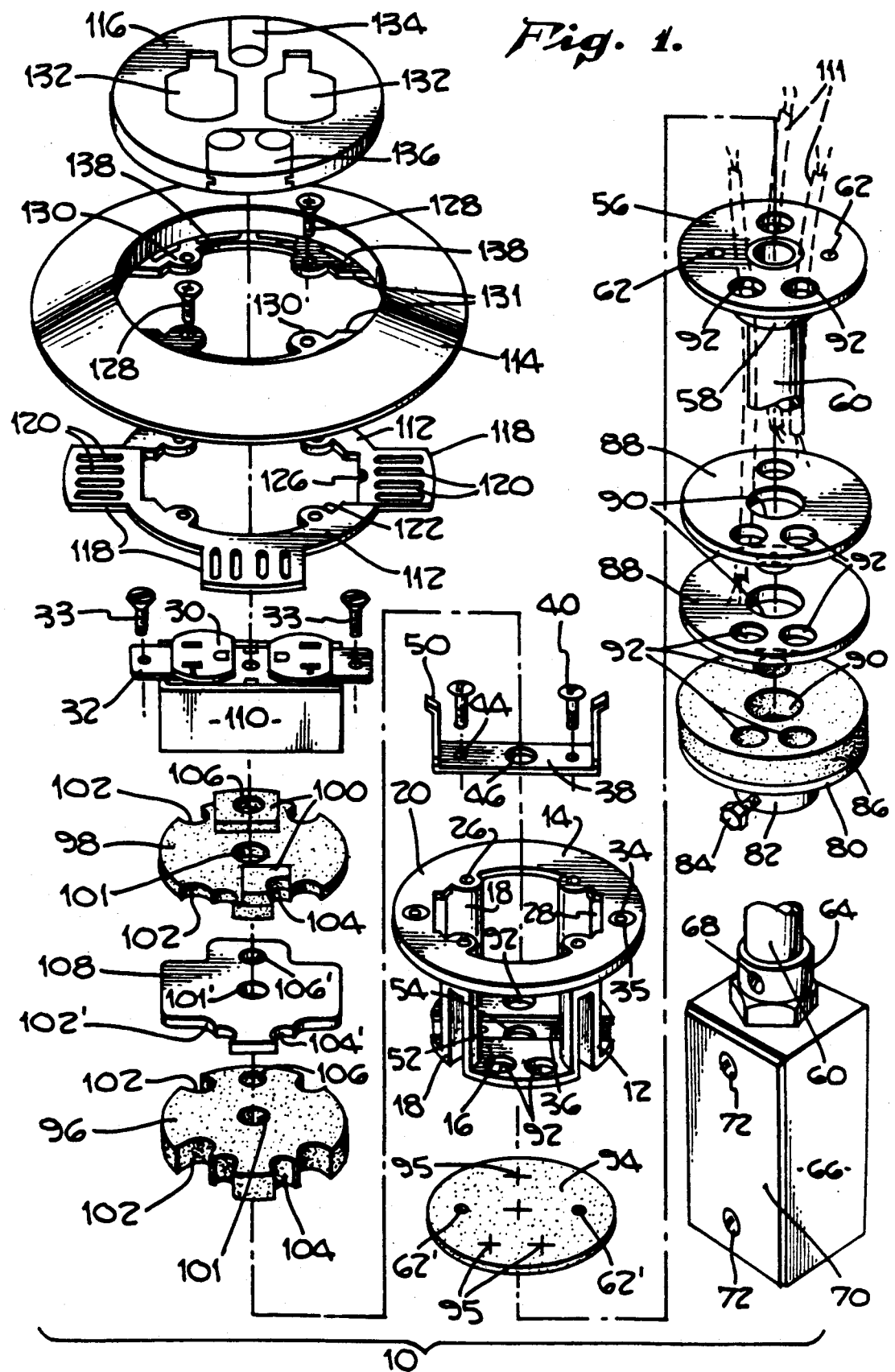
FIG. 1 is a perspective view showing the poke-through connector assembly, of the present invention.
Figure 2:
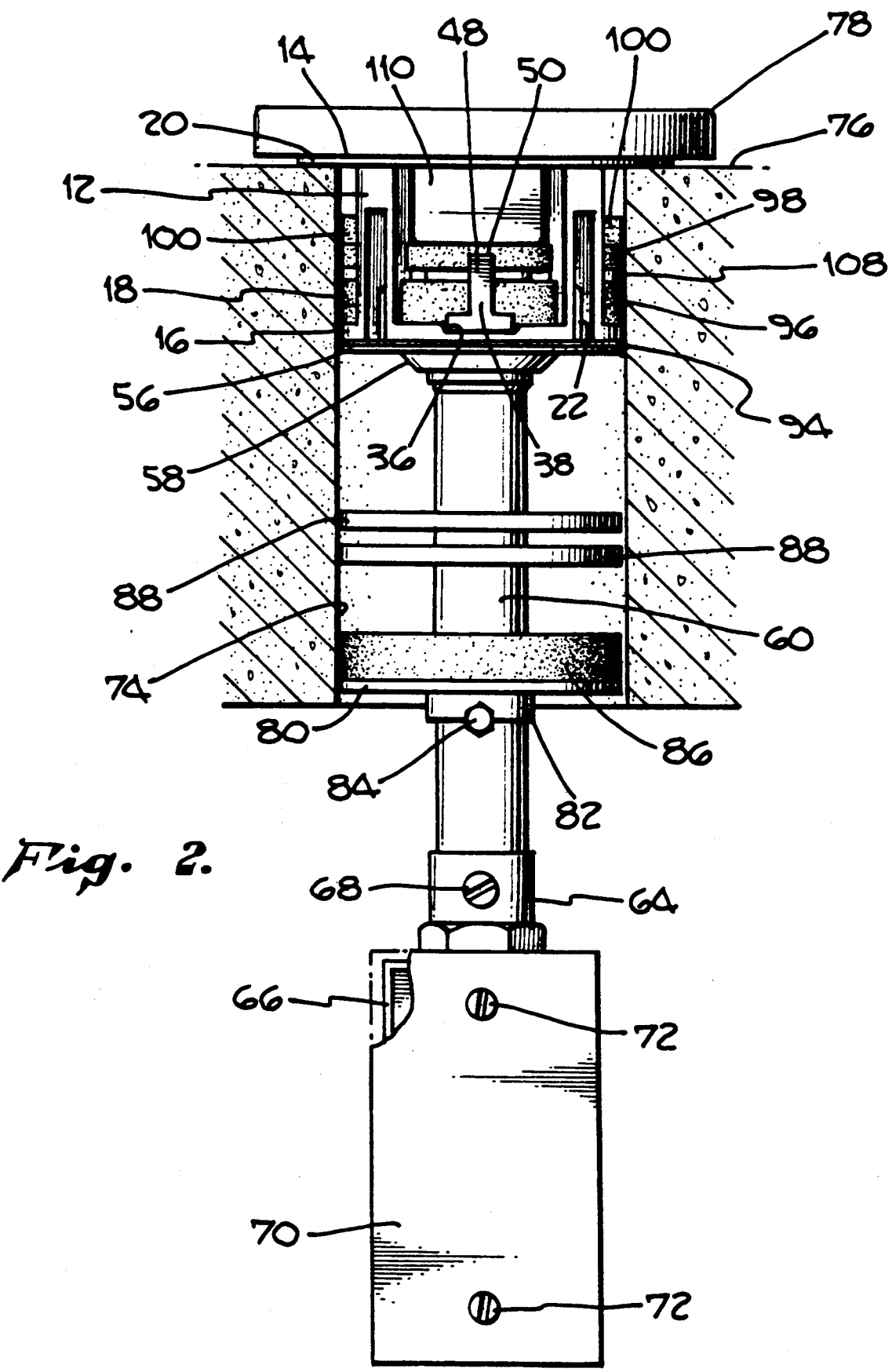
FIG. 2 is a side view of the connector assembly.

Referring now to the drawings, FIGS. 1 and 2 show a poke-through connector assembly 10 having an insulated retainer basket 12 formed by parallel upper and lower surfaces 14 and 16, respectively, joined by four integral columns 18. In the preferred embodiment, the basket 12 is molded or cast from a suitable polycarbonate material such as a material sold by G.E. under the trade name Lexan which has a softening temperature of approximately 305° F.

Figure 5:
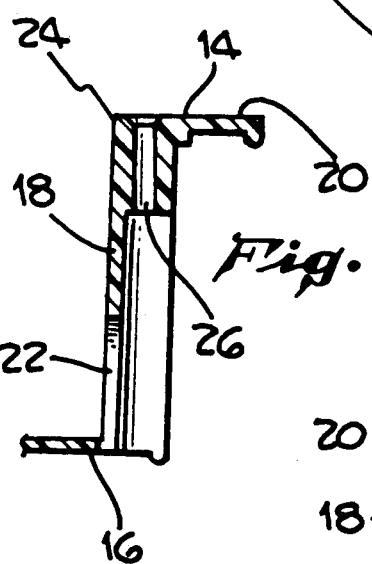
FIG. 5 is a cross-sectional view taken along lines 5—5 of FIG. 4 showing a column of the basket.
Figure 4:
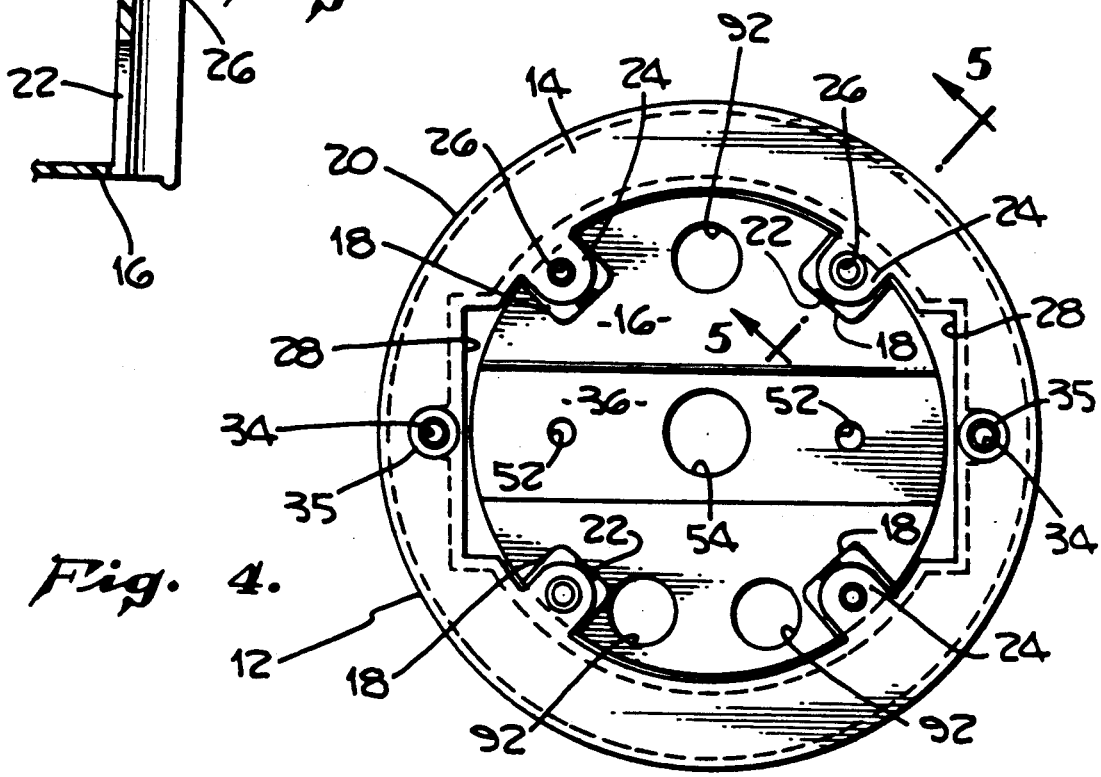
FIG. 4 is a top view of the insulated basket.

As best seen in FIGS. 4 and 5, the basket 12 has an outwardly extended upper surface 14 which forms a mounting or stop flange 20. Each column 18 extends integrally from the upper surface 14 to the lower surface 16. Note that the diameter of lower surface 16 is less than the circular opening in the upper surface 14 so that the two surfaces (14 and 16) are not opposing surfaces. This provides a space for intumescent material (discussed below) to vertically expand. Part of the way down from the upper surface 14, column 18 takes on a generally U-shape to produce a uniform cross-section. A little further down column 18 a slot 22 bifurcates each column 18 to significantly reduce the amount of heat that is transferred by convection from lower surface 16 to upper surface 14 and to allow intumescent material (discussed below) to fill the U-shaped void.

As best seen in FIG. 4, columns 18 join upper surface 14 at four mounting bosses 24, each having an aperture 26 which may be threaded, as by tapping, for receipt of a suitable machine screw. Upper surface 14 is also relieve at 28 to form opposite ends of a rectangular cutout which receives a duplex receptacle 30, FIG. 1. Receptacle 30 has mounting extensions 32 that extend over the relieved areas 28 in basket 12 and rest upon the mounting flange 20 formed by upper surface 14. Surface 14 is also provided with apertures 34 into which are inserted threaded bushings 35 which may be retained therein by sonic welding, heat insertion or some other method. The inserts may be provided with a suitable locking device to retain a pair of machine screws 33 which pass through apertures in the mounting extensions 32 of receptacle 30 for mounting the receptacle to the upper surface 14 of basket 12.

The lower surface 16 of basket 12 is provided with a relief 36 which forms a rectangular platform slightly lower than the surface 16. A spring clip 38, best seen in FIG. 6, is placed through the relieved apertures 28 in the upper surface 14 of basket 12 and secured within the rectangular relief 36 by mounting screws 40, as seen in FIG. 1.

The spring clip 38 is generally U-shaped with a base 42 having two apertures 44 therein through which the mounting screws 40 pass. The center of the base 42 is provided with a larger aperture 46 through which the electrical wires that carry the power to receptacle 30 pass. The two vertical legs 48 of the U-shaped spring clip 38 terminate at upwardly and outwardly bent tangs 50 which extend beyond the diameter of retainer basket 12 established by the diameter of lower surface 16. The retaining function of tangs 50 will be described hereinbelow.

Referring once again to FIG. 4, it will be seen that the rectangular relief 36 in lower surface 16 of basket 12 is also provided with a pair of apertures 52 through which the mounting screws 40 pass and an aperture 54 through which the power wires pass. Mounted to the outside of lower surface 16 is a base plate 56 (FIGS. 1 and 2) which has been drawn to form a collar 58 to which is attached an electrical conduit 60 by, for example, swaging the end of conduit 60 into an aperture, not shown, formed in the collar 58. It will be seen in FIG. 1 that base plate 56 is provided with a pair of threaded apertures 62 which are aligned with the apertures 52 in basket 12 and apertures 44 in spring clip 38 to receive the mounting screws 40 for connecting the electric conduit 60 to the lower surface 16 of basket 12.

It will also be seen in FIG. 1 that the lower end of electric conduit 60 receives a conduit fitting 64 which is mounted to the upper surface of a generally rectangular outlet box 66. The outlet box 66 is attached via conduit fitting 64 to the conduit 60 by a screw 68 and is provided with a protective cover 70, also attached by screws 72 (FIG. 2). The conduit box 66 forms the second or lower electrical receptacle of the poke-through connector assembly, while the duplex receptacle 30 forms the upper or first receptacle.

The hardware described thus far provides a limited poke-through connector assembly 10 which may be inserted into a bored aperture 74 within a concrete floor 76, as seen in FIG. 2. Here, the poke-through connector assembly 10 including its outlet box 66, base plate 56, and retaining basket 12 all fit with adequate clearance through the aperture 74 in flooring 76. The tangs 50 on spring clip 38 are larger from tip to tip than the diameter of the floor aperture 74. This causes the legs 48 of spring clip 38 to yield to permit the forced insertion of the poke-through connector 10 until the flange 20 of basket 12 engages the floor to prevent further insertion. The tangs 50 of the spring clip 38 prevent the removal of the poke-through connector 10. There is no necessity for an installer to push the poke-through connector 10 through from an upper floor and then go to the lower floor to complete the installation. The installation may be accomplished by an installer simply inserting the poke-through connector 10 into aperture 74 and then standing on a protective cover 78 which is provided with extending prongs, not shown, for locking the protective cover 78 into the receptacle 30 and the poke-through connector 10.

The connector 10 may be prewired or partially wired so that upon insertion of the connector 10 into the floor aperture 74 it is ready for wiring from the lower surface of floor 76 at the outlet box 66. However, the device described thus far has only a limited ability to prevent heat or smoke that results from a building fire from passing from lower floor to an upper floor. The poke-through connector assembly 10 may be made smoke, heat and fire resistant by the addition of intumescent wafers, a smoke gasket and an insulating cover around the receptacle 30 to be described below.

First, an adjustable plate 80 having a collar 82 is slidably placed upon the conduit 60 and attached thereto by a screw 84. The adjustable plate 80 has a wafer 86 constructed from intumescent material that is one-half inch thick, for example. The wafer 86 may be attached to plate 80 by, for example, double backed tape, not shown. It will be seen in FIGS. 1 and 2 that additional intumescent wafers 88 which may be one-quarter inch thick, for example, are added along the conduit 60 to increase the fire rating of the poke-through connector 10. In the preferred embodiment, one to four such wafers 88 may be added to increase the fire rating of the poke-through connector 10 for higher rated floors. The intumescent wafers 86 and 88 are provided with a plurality of apertures including a large central aperture 90 which permits the wafer to fit about the conduit 60 and three smaller apertures 92 through which may be passed various electrical signal wires for telephone, computer, facsimile, and other electronic devices. These same apertures 92 for electrical signal wires will be found in the base plate 56 and the lower surface 16 of retainer basket 12, seen in FIG. 4.

The poke-through connector assembly 10 is made resistant to the passage of smoke from a lower floor through the floor aperture 74 by a smoke gasket 94 which may be made from various materials including a 1/32-inch thick sheet of silicone rubber having an outer diameter that is larger than the inner diameter of the floor aperture 74 to seal that aperture against the passage of smoke. It will be seen that the smoke gasket 94 is retained between the lower surface 16 of basket 12 and the base plate 56 by the screws 40 which pass through a pair of round aperture 62' in the gasket 94. The gasket is also cut with X-shaped openings 95 for the passage of the signal wires.

Next, the retainer basket 12 is filled with intumescent wafers 96 and 98. The lowermost wafer 96 is constructed from a one-half inch thick sheet of intumescent material, while the second wafer 98 is constructed from a one-quarter inch thick sheet of intumescent material, for example. The shape of the intumescent wafers 96 and 98 which fit within basket 12 is best seen in FIG. 7. The thinner upper wafer 98 is shown in FIG. 7 with two additional blocks of intumescent material 100 bonded or connected by adhesive, such as double backed tape, to its upper surface. These blocks 100 and wafer 98 expand both horizontally and vertically to fill the void about the receptacle 30 and the electric signal wires to provide insulation thereto when and if the poke-through connector 10 is exposed to heat. As seen in FIG. 7, each wafer 96 and 98 is provided with a central aperture 101 through which the power wiring is passed. In addition, there are four notches 102 located at 45°, 135°, 225° and 315° about the periphery of wafers 96 and 98. These notches 102 provide a clearance for the columns 18 of basket 12. There are two additional notches 104 adjacent and inside the notches 102 located at 135° and 225° on wafers 96 and 98 to accommodate the passage of electrical signal wires which pass through apertures 92 described above. Finally, an aperture 106 is located within wafers 96 and 98 at the zero or 360° location for the passage of the electrical signal wires. As seen in FIG. 7, the blocks 100 also have the apertures 106 and 106' passing therethrough.

As seen in FIGS. 1 and 2, a spacer 108 is located between the wafers 96 and 98 in basket 12. This spacer 108, best seen in FIG. 8, may be cast from a polycarbonate material such as that manufactured by G.E. under the trademark LEXAN. It will be seen in FIG. 8 that the spacer 108 is molded with a configuration similar to the wafers 96 and 98 having a central aperture 101', notches 102' to fit around columns 18, additional notches 104' to permit the passage of two sets of electrical signal wires and an aperture 106' to permit the passage of a further set of electrical signal wires. The reader will understand that the electric power wires are passed through the apperture 101'. The purpose of the spacer 108 is to assure that an intumescent wafer closest to the heat from a fire, generally wafer 96, will expand first to cause the smooth and uniform expansion of intumescent wafer 96 before wafer 98 begins to expand. Should a fire originate on a lower floor causing the outlet box 66 and conduit 60 to heat up, that heat will be carried by convection and conduction up the conduit 60 to the base plate 56. As the intumescent wafer 96 is heated, it will begin to expand. This heating and expansion will occur before the heating and expansion of the second wafer 98. Spacer 108 rises with the expansion of wafer 96 to assure a uniform expansion of that wafer and to assist in forcing the second wafer 98 up and into the voids around the duplex 30. Thus, it will be seen that the combination of the wafer 96, spacer 108, and wafer 98 serves to eliminate voids within the retainer basket 12.

Further insulation is accomplished by placing a box 110, FIGS. 1 and 2, about the duplex receptacle 30. This box is made of insulating aramide fiber and paper, such as that manufactured by DuPont and sold under the trade name NOMEX, which retains its structural integrity at temperatures in excess of 2000° F. The box functions to retain the electrical power wires shown schematically at 111 in FIG. 1 within a given area after the receptacle 30 begins to deteriorate due to heat. This box also helps to hold out the heat generated from below.

The poke-through connector assembly 10 has now been described including all of its parts which may be supplied for pre-assembly within an aperture 74 in a concrete floor 76. As the poke-through connector is inserted into the floor aperture 74, it is forced down until the flange 20 on upper surface 14 of basket 12 engages the upper surface of the concrete floor 76. An installer knowing the thickness of the concrete floor 76 adjusts the adjustable plate 80 to the desired location along conduit 60 and then tightens screw 84 to secure that plate. The adjustable plate thus permits the poke-through connector to be universally used with any number of floor thicknesses with the adjustment of but a single screw 84. After assembly, the protective cover 78 which served as a force plate to receive the weight of the installer's foot, for example, also protects against dust and dirt from entering into the receptacle 30.

When the building in which the connector 10 is installed has been completed enough to finish wiring the various floor receptacles and to lay a carpet, the protective cover 78 may be left under the carpet and used as a pattern to cut an appropriate hole within the carpet. After the carpet has been cut, the installer may complete the poke-through connector assembly through the use of a kit containing a radiator fin 112, a carpet ring 114 and a cover assembly 116.

The radiator fin may be constructed from sheet metal, 18 gauge corrosion resistant steel, for example, and, as seen in FIG. 9, shaped in a generally crescent configuration with an inner diameter which matches the inner diameter of basket 12. The radiator fin has an outer diameter which also matches the outer diameter of the mounting flange 20 of basket 12. Extending from the outer diameter of the radiator fin 112 are a pair of platforms 118 which provide for the heat exchange activity of the radiator fin 112. Platforms 118 have been relieved by elongated apertures 120. It will be seen that the inner diameter of the radiator 112 is provided with inwardly extending tabs 122 which align themselves with the mounting bosses 24 on basket 12. Finally, the inner diameter of the radiator fin is rectangularly relieved at 124 opposite the right-hand most platform 118 in FIG. 9 to align itself with the relief 28 in the flange 20 of the retainer basket 12. This relief 124 includes a notch 126 which fits under the mounting extensions 32 of duplex receptacle 30 and one of the screws 33.

In final assembly, the dust cover 78 is removed and the screws 33 which mount the duplex receptacle 30 are backed off to permit the insertion of the radiator fin 118 and notch 126 under the mounting extensions 32 of duplex receptacle 30 and screws 33 upon the upper surface 14 of basket 12. The carpet ring 114 is then placed over the duplex 30 and a pair of screws 128 passed through tabs 130 extending from crescent shaped flanges 131 on the inner diameter of the carpet ring 114 and into the threaded apertures 26 in mounting bosses 24 of retainer basket 12. Screws 128 may be flat head screws which pass through counter-sunk apertures in tabs 130.

Figure 3:
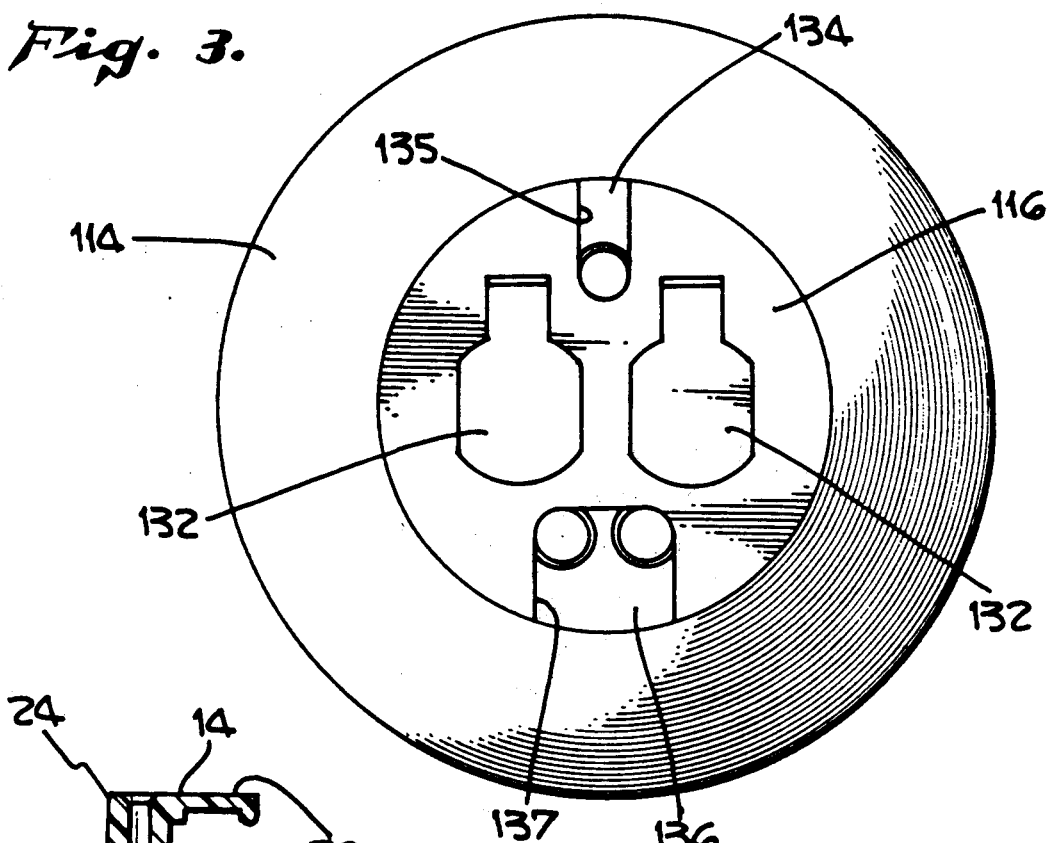
FIG. 3 is a top view of the connector assembly.

The last part to be installed within the poke-through connector 10 is the cover assembly 116. This cover assembly 116 has been designed to be free of any metal parts that might contribute to the storage of heat. It is more fully described in a co-pending application, Ser. No. 531,253, filed on May 31, 1990. As seen in FIG. 3, the disk-shaped cover assembly 116 includes a pair of utility caps 132 which cover the electrical outlets from the duplex receptacle 30. In addition, a narrow, individual electrical signal wire cover 134 slides into a slot 135 in the edge of the disk-shaped cover assembly 116 while a wider, double electrical signal wire cover 136 slides into a wider slot 137 in the cover from the opposite side.

It will now be seen that the cover assembly 116 may be placed within a suitable opening in carpet ring 114 and attached thereto by a single screw which passes between a divider between the utility caps 132 (not shown) and into a central threaded aperture within the duplex receptacle 30.

The reader will note that the poke-through connector 10 is intended to be wired with electrical signal wires or data cables passing through one of the apertures 92 and the double cover 136. A typical data cable includes six pairs of wires and a grounded metal shield. Because these data cables carry more wires than a typical telephone wire, which may include four or six wires, it is desirable to separate the data cables 180° from each other within the poke-through connector 10. The reader will see that the poke-through connector assembly 10 is uniquely arranged to permit the high voltage power wires 111 to pass through the conduit 60 at the center of the connector 10 from the outlet box 66 to the duplex receptacle 30. The lower voltage electrical signal wires pass through the outer portions of the connector 10 in the apertures 92 provided. The advantage of this arrangement includes the separation of the masses of wire to reduce the amount of heat energy that might be transferred up these wires during a fire. The separation also eliminates the need for a metal partition often found in prior art poke-through connectors which serves to conduct heat energy from the lower end of the prior art feed-through connector to the upper end.

The reader will understand that there is no continuous metal connection between the lower end, outlet box 66, for example, and the upper end, duplex receptacle 30 of the poke-through connector 10. No metal connection, that is, but for the electrical power wires 111 or the electrical signal wires, not shown. This lack of a metal-to-metal contact between the upper and lower ends of the connector 10, and thus between the upper and lower surfaces of a concrete floor 76, serves to reduce the amount of heat energy carried between surfaces of the floor through the connector 10.

If a fire were to start in an area below the surface of floor 76, the initial smoke would be blocked by the smoke gasket 94. As heat builds up, that heat will be conducted up the conduit 60 to the base plate 56. This heat will cause the expansion of the intumescent wafers 86 and 88 to fill the floor aperture 74, thus eliminating any heat that might pass therethrough by convection or radiation. As base plate 56 continues to heat up, the intumescent wafer 96 will expand to force spacer 108 in an upward or vertical direction which forces the intumescent wafer 96 and its intumescent blocks 100 around the duplex 30. The upper and lower surfaces 14 and 16 of bracket 12 are arranged as non-opposing surfaces to permit such expansion. Continued exposure to heat will eventually cause the basket 12 to deteriorate. However, the poke-through connector 10 will not fall from the floor aperture 74 due to the presence of the spring clip 38 which has locked the connector 10 into floor aperture 74. Heat carried up the three power wires 111, including the hot and neutral wires, normally colored white and black, will cause the eventual melting of receptacle 30. However, the insulating box 110 about receptacle 30 prevents the spread of this heat to some extent. Further, the heat carried up the ground wire, generally colored green, will dissipate through the receptacle 30 to the mounting extensions 32 where that heat will be carried off by radiation and, to some extent, convection through the radiator fins 112. The crescent flanges 131 of the carpet ring 114 are provided with elongated slots 138 to aid the dissipation of heat by radiation and convection from the radiator fins 112, FIG. 1. Through this arrangement, the simplified design of the poke-through connector assembly 10 of the present invention can easily meet the required fire rating. The poke-through connector assembly can also be easily installed from one side of the floor 76 to fit any thickness of floor material.

It will be understood that configurations other than those shown for the various components are possible, and that other patterns for the electrical signal wires may be utilized. Therefore, the present invention should not be limited by the foregoing description of the preferred embodiment.

I claim:

1. A poke-through connector assembly for establishing an electrical connection through an aperture in a concrete floor, comprising:
   a basket formed of electrical and thermal insulating material having an upper and lower surface;
   a plurality of integral insulating columns joining said upper and lower surface;
   said upper surface including a flange larger than said aperture to locate and prevent said poke-through connector assembly from passing fully through said aperture; and
   a spring clip mounted upon said lower surface of said basket to prevent said poke-through connector assembly from being withdrawn from said aperture, whereby said clip is electrically and thermally insulated from said flange.

2. The poke-through connector assembly of claim 1, additionally comprising:
   an electrical conduit having an upper base plate attached thereto;
   said base plate attached to said spring clamp, whereby said spring clamp supports the weight of said electrical conduit.

3. The poke-through connector assembly of claim 2, additionally comprising:
   an adjustable plate slidably mounted upon said electrical conduit;
   at least one intumescent wafer mounted upon said adjustable plate between said plate and said basket; and
   means for securing said adjustable plate to said electrical conduit, whereby said poke-through connector assembly may be mounted in concrete floors of various thicknesses with said adjustable plating sealing the lowermost opening of said aperture in said floor.

4. The poke-through connector assembly of claim 3, additionally comprising:
   a plurality of intumescent wafers mounted upon said electrical conduit for increasing the fire rating of said assembly.

5. The poke-through connector assembly of claim 2, additionally comprising:
   a smoke gasket mounted between said upper base plate of said electrical conduit and the lower surface of said basket.

6. The poke-through connector assembly of claim 2, additionally comprising:
   an electrical receptacle having mounting extensions which extend over said flange of said upper surface of said basket and mount thereto;
   electrical power wires connected to said receptacle and extending from said receptacle through said basket and electrical conduit; and
   electrical signal wires extending outside said receptacle through said basket and outside said electrical conduit, whereby said electrical power wires are separated from said electrical signal wires.

7. The poke-through connector assembly of claim 1, additionally comprising:
   a plurality of intumescent wafers inserted into said basket about said columns between said upper and lower surfaces.

8. The poke-through connector assembly of claim 7, additionally comprising:
   a spacer inserted between said plurality of intumescent wafers in said basket to inhibit the intumescence of a wafer on the opposite side of said spacer from a source of heat until after a wafer close to said source of heat has undergone intumescence.

9. The poke-through connector assembly of claim 1, wherein:
   said columns are formed by at least a pair of bifurcated legs at a point where each column is integral with one of said surfaces of said basket to inhibit the spread of heat by conduction between surfaces.

10. The poke-through connector assembly of claim 1, additionally comprising:
    an electrical receptacle having mounting extensions which extend over said flange of said upper surface of said basket and mount thereto; and
    an insulator box surrounding said electrical receptacle to retain and insulate said electrical wires therein.

11. The poke-through connector assembly of claim 10, additionally comprising:
    a radiator fin mounted between said mounting extensions of said electrical receptacle and said flange of said upper surface of said basket to dissipate heat conducted to said receptacle from said electrical wires.

12. A poke-through connector assembly for establishing an electrical connection through an aperture in a floor, comprising:
    a basket of insulating material having an upper surface with an extended flange, a lower surface, and integral columns joining said surfaces;
    a first electrical receptacle mounted upon said extended flange of said upper surface;
    a spring clip mounted upon said lower surface;
    a conduit attached to said spring clip and extending below said lower surface;
    a second electrical receptacle mounted below and upon said conduit;
    electric power wires joining said first and second electrical receptacles; and
    said insulating basket thereby preventing any metal-to-metal connection between said first and second electrical receptacles but for said electric power wires.

13. The poke-through connector assembly of claim 12, additionally comprising:
    said conduit having an upper base plate attached thereto; and
    said base plate attached to said spring clamp, whereby said spring clamp supports said electrical conduit.

14. The poke-through connector assembly of claim 13, additionally comprising:
    an adjustable plate slidably mounted upon said conduit;
    at least one intumescent wafer mounted upon said adjustable plate between said plate and said basket; and
    means for securing said adjustable plate to said conduit, whereby said poke-through connector assembly may be mounted in concrete floors of various thicknesses with said adjustable plating sealing the lowermost opening of said aperture in said floor.

15. The poke-through connector assembly of claim 13, additionally comprising:
    a smoke gasket mounted between said upper base plate of said conduit and the lower surface of said basket.

16. The poke-through connector assembly of claim 12, additionally comprising:

a plurality of intumescent wafers inserted into said basket about said columns between said upper and lower surfaces.

17. The poke-through connector assembly of claim 16, additionally comprising:

a spacer inserted between said plurality of intumescent wafers in said basket to inhibit the intumescence of a wafer on the opposite side of said spacer from a source of heat until after a wafer close to said source of heat has undergone intumescence.

18. The poke-through connector assembly of claim 16, wherein:

said columns are formed by at least a pair of bifurcated legs at a point where each said column is integral with said lower surfaces of said basket to inhibit the spread of heat by conduction between said surfaces and to allow said intumescent wafers to fill between said bifurcated legs.

19. The poke-through connector assembly of claim 12, additionally comprising:

an insulator box surrounding said electrical receptacle to retain said electric power wires therein.

20. The poke-through connector assembly of claim 12, additionally comprising:

a radiator fin mounted between said electrical receptacle and said flange of said upper surface of said basket to dissipate heat conducted to said receptacle from said electric power wires.

21. The poke-through connector assembly of claim 12, additionally comprising:

electrical signal wires extending outside said first electrical receptacle through said basket and outside said conduit, whereby said electric power wires are separated from said electrical signal wires.

22. The poke-through connector assembly of claim 12, additionally comprising:

a plurality of intumescent wafers mounted upon said conduit for increasing the fire rating of said assembly.

23. A poke-through connector assembly for establishing an electrical connection through an aperture in a floor, comprising:

a basket formed from insulating material having an upper extended flange surface, a lower surface, and integral columns joining said surfaces;

a first electrical receptacle mounted upon said upper extended flange surface;

a spring clip mounted upon said lower surface;

a conduit having an upper and lower end, said upper end attached to said spring clip;

a second electrical receptacle mounted upon said lower end of said conduit;

electric power wires joining said first and second electrical receptacles; and said insulating basket thereby preventing a metal-to-metal connection between said first and second electrical receptacles but for said electric power wires;

said integral columns and said lower surface of said basket, said conduit, and said second electrical receptacle all sized smaller than said floor aperture;

said upper extended flange of said basket sized larger than said floor aperture; and said spring clip sized to yield as said basket is placed within said floor aperture, whereby said poke-through connector assembly may be inserted from one side of said floor aperture ready to wire from the opposite side thereof.

* * * * *